Jan. 27, 1970   B. K. JOHNSON   3,491,672
INERTIAL DELAY MEANS FOR EXPOSURE CONTROL APPARATUS
Filed April 27, 1967   2 Sheets-Sheet 1

INVENTOR.
Bruce K. Johnson
BY
Brown and Mikulka
and
James L. Neal
ATTORNEYS

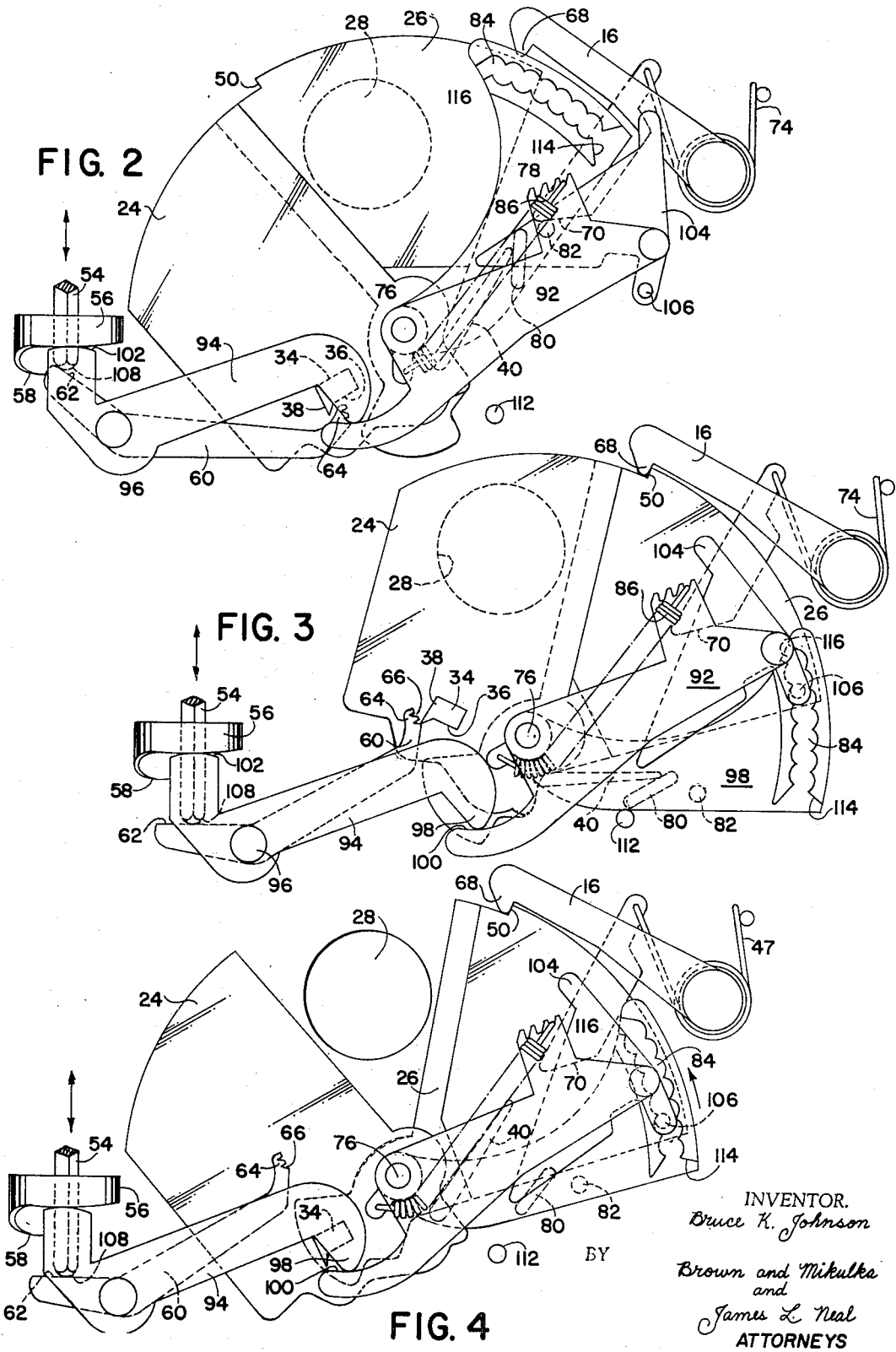

United States Patent Office 3,491,672
Patented Jan. 27, 1970

3,491,672
INERTIAL DELAY MEANS FOR EXPOSURE CONTROL APPARATUS
Bruce K. Johnson, Andover, Mass., assignor to Polaroid Corporation, Cambridge, Mass., a corporation of Delaware
Filed Apr. 27, 1967, Ser. No. 634,323
Int. Cl. G03b 9/00, 9/20, 9/26
U.S. Cl. 95—53
14 Claims

ABSTRACT OF THE DISCLOSURE

A two bladed photographic shutter incorporates an inertial timing device for controlling the duration of an exposure interval. The timing device includes for relative movement an elongated cam defining a series of reverse inflections and an inertia member mounting a cam follower. Interaction between the cam and inertia member regulates the interval between release of an aperture opening blade and an aperture closing blade.

BRIEF SUMMARY OF THE INVENTION

This invention contemplates use of photographic exposure control apparatus having shutter blade means mounted for exposure producing movement relative to an exposure aperture and inertial delay means for regulating movement of the shutter blade means to thereby regulate the length of exposure. More particularly, the invention is directed to such apparatus wherein trip means and inertia means are movable from initial relative positions to final relative positions, against operation of the inertia means, the trip means being effective to terminate exposure when it reaches its final relative position.

In one embodiment, the apparatus may include actuating means, cocking means, shutter blade means having opening and closing blades mounted for movement relative to an exposure aperture, trip means, inertia producing means, set means and drive means In this embodiment the actuating means operates the cocking means to move the opening blade to a position wherein it blocks the exposure aperture and the closing blade to a position wherein it unblocks the exposure aperture; thereafter the cocking means releases the opening blade for aperture unblocking movement to initiate exposure. The closing blade is releasably retained in the aperture unblocking position a predetermined period of time after release of the opening blade to establish an exposure interval of controlled duration. Upon release of the closing blade, it moves to aperture blocking position to terminate the exposure interval.

The trip means, inertia means, set means and drive means cooperate to effect a predetermined delay between aperture unblocking movement of the opening blade and aperture blocking movement of the closing blade to control duration of the exposure interval.

The inertia means and trip means are mounted for relative movement between initial and final relative positions during exposure, said trip means being effective to release the closing blade when it reaches it final relative position. Means forming elongated oppositely facing cam surfaces characterized by a series of reverse inflections, for example, one establishing a zig-zag pattern, extends from a portion of either the trip means or the inertia means. The other of the trip means and inertia means includes a follower operatively engageable with the cam surfaces. Drive means moves the trip means and the inertia means and thus the cam surfaces and the follower relative to each other so that an oscillatory pattern of movement is imparted to the inertia means by the aforesaid cam surfaces. Movement of the inertia means produces inertia drag to retard the aforesaid relative movement between the trip means and the inertia means and thus delays release of the closing blade.

The relative initial positions of the inertia means and the trip means may be selectively varied to selectively vary duration of the exposure interval. Variation in the initial relative positions of the trip means and the inertia means variably determines the extent of said relative movement through which said cam surfaces and said follower are in engagement. For example, if their relative positions are such that the follower engages the cam surfaces through a relatively small amount of relative movement, there will be only a small inertial delay and the resulting exposure interval will be relatively short. On the other hand, if their relative positions are such that the follower engages the cam surfaces through a relatively large amount of relative movement, there will be a relatively large inertial delay and the resulting exposure interval will be relatively long.

It is a primary object of this invention to provide reliable and relatively uncomplicated photographic apparatus for controlling the duration of an exposure interval.

It is a further object to provide a reliable exposure control apparatus wherein the duration of the exposure interval is controlled by a relatively uncomplicated mechanical timing device.

Other objects of the invention will in part be obvious and will in part appear hereinafter.

BRIEF DESCRIPTION OF THE DRAWINGS

The invention accordingly comprises the apparatus possessing the construction, combination of elements and arrangement of parts which are exemplified in the following detailed disclosure of a preferred embodiment taken in connection with the accompanying drawings wherein:

FIG. 2 is a plan view of the apparatus of FIGURE 1, prior to cocking operation thereof and subsequent to selective positioning of the inertia means;

FIG. 3 is a plan view of the apparatus of FIGURE 1 in the cocked position, prior to exposure; and FIG. 4 is a plan view of the apparatus of FIGURE 1 showing a position obtained by the elements thereof during exposure.

DETAILED DESCRIPTION OF THE DRAWINGS

Figure 1:
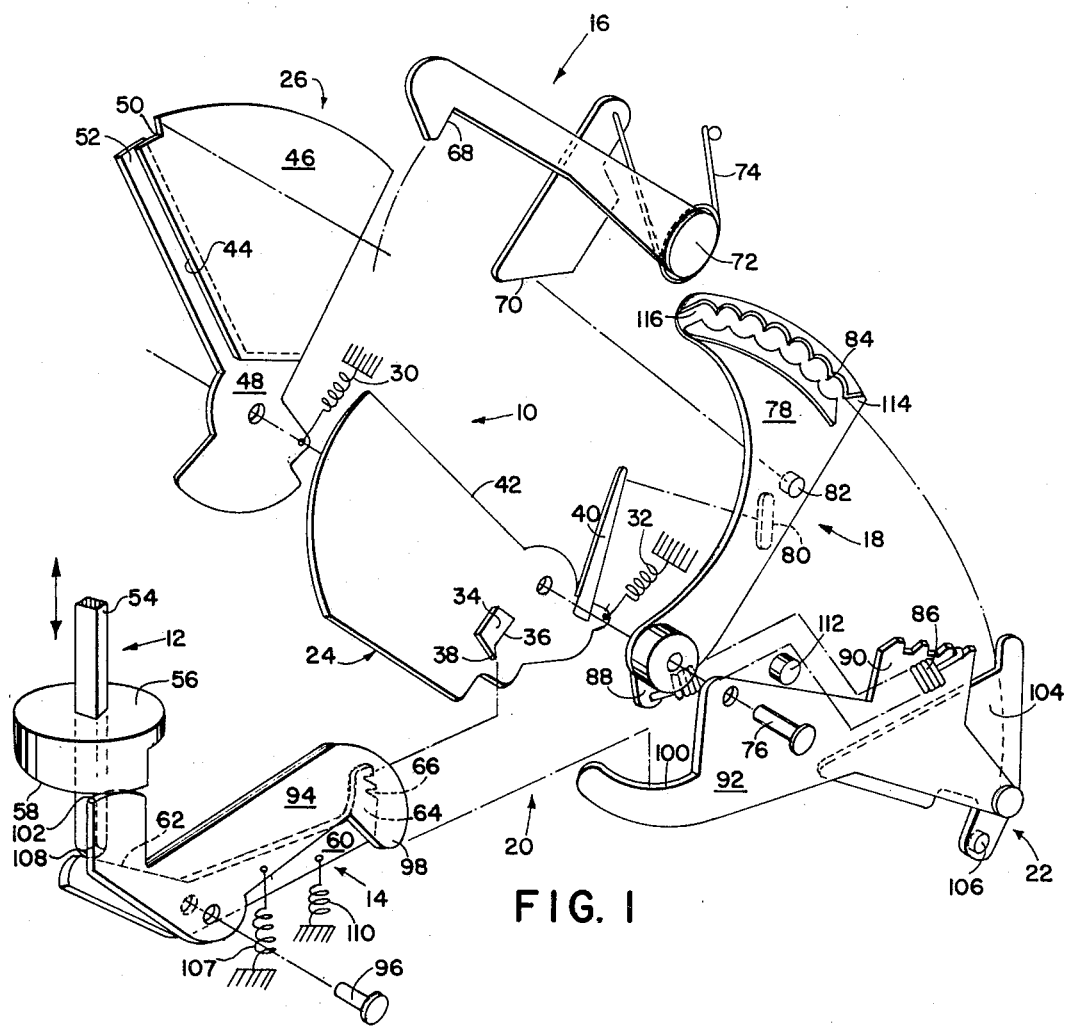
FIGURE 1 illustrates, in exploded perspective, one embodiment of the exposure control apparatus of the present invention.

Reference is now made to FIGURE 1 wherein one embodiment of the exposure control apparatus of the present invention is shown. This embodiment includes shutter means 10, actuating means 12, cocking means 14, latch means 16, trip means 18, set means 20, and inertia means 22.

Shutter means 10 comprises opening blade 24 and closing blade 26. The opening blade is movable from an unblocking position relative to aperture 28 to an aperture blocking position. The closing blade is movable from an aperture blocking position to an aperture unblocking position. Blades 24 and 26 are biased counter-clockwise to their unblocking and blocking positions by springs 30 and 32, respectively. Opening blade 24 includes ramp means 34 having surface 36 and detent 38 thereon for cooperation with cocking means 14 and relatively stiff, resilient leaf spring 40 extending therefrom for cooperation with trip means 18. Surface 42 of blade 24 abuts surface 44 of blade 26 so that clockwise movement of blade 24 imparts like movement to blade 26. Closing blade 26 includes opaque member 46, surface 44 on member 46 for cooperation with surface 42 of blade 24, movable support 40 for mounting the opaque member, and seat 50. Elongated portion 52 extending from support 48 forms a light seal along abutting surfaces 42 and 44.

Actuator means 12 includes shaft 54 mounted for axial movement and rotary cam member 56 mounted on shaft 54. The mounting permits axial movement of the shaft relative to the cam member but prohibits relative rotary movement therebetween. For example, the shaft may be non-circular in cross section and extend through a slightly larger opening of complementary shape in the cam member. The lower surface of cam member 56 forms cam surface 58.

Cocking means 14, for transferring action of the actuator means to the shutter means, comprises cocking lever 60 pivotally mounted intermediate its ends. One end of the lever defines surface 62 and extends beneath the lower end of shaft 54. The opposite end thereof, 64, includes notches 66 and extends into co-operating relationship with ramp means 34 on blade 24.

Latch means 16 includes hook 68 and anvil 70, and is mounted for pivotal movement about hub 72. Spring 74 biases latch means 16 counter-clockwise about the hub.

Trip means 18 is pivotally mounted about pin 76 and comprises lever 78 bearing projection 80, hammer 82 and opposed cam surfaces 84. Drive spring 86 is attached to lever 78 at 88 and extends to engagement with portion 90 of member 92 to bias lever 78 counter-clockwise.

Set means 20 includes interacting delay set lever 94 and delay arm 92. Both lever 94 and arm 92 are pivotally mounted intermediate their ends, on pins 96 and 76, respectively. Portion 98 of lever 94 bears against cam surface 100 of arm 92. Cam follower surface 102 at the end of lever 94 opposite end 98 is positioned for engagement by cam surface 58 of cam member 56 so that rotation of member 56 effects pivotal movement of lever 94. Delay arm 92 forms cam surface 100 at one end and supports inertia means 22 at the other. Drive spring 86 connecting portion 90 of arm 92 to portion 88 of trip lever 78 biases arm 92 clockwise, in the opposite direction to the area of the trip lever. The clockwise bias of delay arm 92 moves cam surface 100 toward engagement with portion 98 of delay set lever 94.

Inertia means 22 comprises weighted member 104 and follower 106 affixed thereto. Weighted member 104 is mounted upon arm 92 in a manner permitting its free pivotal movement relative thereto.

The following is a description of the operation of the above described preferred embodiment.

Inertia means 22 is selectively positioned relative to the locus of travel of trip means 18 to locate follower 106 along the locus, intermediate the limits thereof, to predetermine the delay between initiation and termination of exposure.

The position of inertia means 22 is selectively varied in response to rotation of shaft 54 which in turn rotates cam member 56; cam surface 58 engages surface 102 of delay set lever 94 to pivot lever 94 about pin 96 against the bias of spring 107. Portion 98 of lever 94 engages surface 100 of delay arm 92 to pivotally position arm 92 about pin 76. Pivotal movement of arm 92 effects the desired positioning of inertia means 22.

When the desired relative positions of delay arm 92 and inertia member 22 have been selected, the apparatus is set for exposure production. One possible set position of the apparatus is shown in FIG. 2.

To effect exposure, shaft 54 is moved axially downward with respect to cam 56. End 108 of the shaft engages surface 62 of cocking lever 60 to pivot the lever counter-clockwise about pin 96 against the bias of spring 110.

Portion 64 of lever 60 moves into contact with surface 36 of ramp means 34 and urges opening blade 24 clockwise about pin 76, from an aperture unblocking position toward and to an aperture blocking position. Blade 24 engages blade 26 and moves it from an aperture blocking position toward and to its aperture unblocking position. When blade 26 moves to its unblocking position, hook 68 of latch means 16 moves into seat 50, under the influence of spring 74, to releasably hold blade 26 in its aperture unblocking position, independently of movement of the opening blade away from the above described engaging relationship.

During clockwise movement of opening blade 24, resilient leaf spring 40 bears against projection 80 of trip lever 78 to move the trip lever clockwise, against the bias of drive spring 86, through a locus of travel. The limits of the locus of travel are defined by stop 112 and the position of anvil 70. The limit defined by the stop will be referred to as the initial position and that defined by the anvil will be called the final position. In the final position, projection 80 nears or abuts spring 40 and hammer 82 bears against and raises anvil 70 for disengaging latch 16.

The counter-clockwise bias imparted to lever 78 by drive spring 86 causes it to rest in its final position. Clockwise movement of trip lever 78 moves hammer 82 away from anvil 70 so that hook 68 of latch 16 moves into bearing engagement with the edge of closing blade 26, for movement to the aforesaid relationship with seat 50 when blade 26 reaches its aperture blocking position.

As clockwise movement of trip lever 78 takes place, entrance portion 114 of cam 84 moves into engagement with follower 106. The cam thereafter moves down over the follower so that the follower assumes a position along the cam surfaces, between entrance end 114 and terminal end 116. The final location of the follower along the cam surfaces depends upon the preselected position of delay arm 92 and inertia member 104, as will hereafter be more fully described.

When trip lever 78 strikes the stop 112, the shutter blades have moved to the positions at which opening blade 24 blocks the exposure aperture and latch 16 engages closing blade 26 in its unblocking position. This position of the apparatus is shown in FIG. 3.

The resilient character of leaf spring 40 permits a small amount of overtravel of the shutter blades after lever 21 strikes the stop so that notches 66 may pass beyond detent 38 of ramp means 34 to release the opening blade for return movement to the aperture unblocking position under the influence of spring 32. This movement of opening blade 24 moves leaf spring 40 from engagement with projection 80 of trip lever 78. The trip arm is then free to move counter-clockwise along its locus of travel, under the influence of drive spring 86. As this movement occurs, cam surfaces 84 move relative to follower 106 so that the zig-zag pattern of the cam surfaces imparts oscillatory motion to the follower and to inertia member 22. Oscillatory movement of member 22 applies inertial drag to the movement of trip lever 78, thus increasing the time required for movement of the trip lever from its initial position toward its final position, through that portion of its locus of travel wherein the cam surfaces and the follower are in engagement. The portion of the travel through which the cam surfaces and the follower are in engagement, and thus the magnitude of the delay is determined by the preselected position of follower 106 relative to cam surfaces 84. For example, a selected position of follower 106 wherein it engages opposed cam surfaces 84 relatively close to entrance 114 thereof, when trip lever 78 is positioned against stop 112, results in a condition whereby small movement of the trip lever is required for cam surfaces 84 to move completely out of engagement with the follower, to thereafter permit free and relatively rapid travel of the trip lever. The result is a small amount of delay and thus a relatively brief exposure interval. A selected position of follower 106 which is relatively near terminal portion 116 of cam surfaces 84 when trip lever 78 is positioned against stop 112, results in a condition wherein almost the entire travel of the trip lever 78 will be subjected to the inertial delaying action of inertia means 22. The magnitude of delay is thus relatively large so there is, correspondingly, a relatively long exposure interval.

FIG. 4 illustrates the apparatus during exposure trip lever 78 being in counter-clockwise movement under the influence of drive spring 86.

When trip lever 78 has moved counter-clockwise through its locus of travel to its final position, hammer 82 strikes anvil 70 on latch means 16 to move the latch clockwise, against the action of spring 74. Hook 68 of the latch means is lifted from seat 50 to release closing blade 26 for counter-clockwise movement to its aperture covering position, to thereby terminate the exposure interval. The apparatus is now returned to the position of FIG. 2.

It is thus apparent that the interval between initiation of the exposure interval and termination of the exposure interval is determined by the amount of inertial delay to which the trip lever is subjected during movement from its initial position, through its locus of travel, to its terminal position. It should, of course, be understood that the invention contemplates relative movement between a cam characterized by reverse inflections and a cam follower, without regard to the members on which they are mounted. While the embodiment disclosed is a preferred embodiment, the cam and cam follower may be alternatively placed.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:
1. Exposure control apparatus for a photographic camera including means for unblocking and blocking an exposure aperture to establish an exposure interval and delay means for controlling the duration of said exposure interval, said delay means comprising:
  (a) first means forming a pair of elongated oppositely facing cam surfaces characterized by a series of reverse inflections;
  (b) second means defining a cam follower cooperating with said oppositely facing cam surfaces;
  (c) an inertia member mounting one of said first and second means;
  (d) means mounting said inertia member and the other of said first and second means for relative movement between initial and final relative positions such that said relative movement between said means causes said inertia member to oscillate back and forth;
  (e) exposure terminating means effective to terminate exposure when said ineritia means and the other of said first and second means reach said final relative positions; and
  (f) drive means for producing said relative movement in response to initiation of exposure.

2. Exposure control apparatus according to claim 1 further comprising means to selectively predetermine said relative initial positions for variably controlling the duration of the interval required for said inertia means and the other of said first and second means to move between said initial and final relative positions.

3. Exposure control apparatus according to claim 1 wherein said elongated oppositely facing cam surfaces comprise an elongated slot forming a zig-zag pattern.

4. Exposure control apparatus for a photographic camera including means for unblocking and blocking an exposure aperture to establish an exposure interval and delay means for controlling the duration of said exposure interval, said delay means comprising:
  (a) means moveable through a locus of travel for regulating the interval between initiation of exposure and termination of exposure;
  (b) means forming a pair of opposed elongated cam surfaces on said interval regulating means, said cam surfaces being characterized by a series of reverse inflection;
  (c) cam follower means;
  (d) inertia means mounted for oscillatory movement, said inertia means supporting said cam follower means in operative engagement with said cam surfaces so that movement of said interval regulating means along said locus of travel imparts oscillatory movement to said inertia means for retarding said movement of said regulating means.

5. Exposure control apparatus according to claim 4 wherein said cam surfaces comprise an elongated slot characterized by alternate directional changes and said cam follower extends into said slot.

6. Exposure control apparatus for a photographic camera according to claim 5 wherein said directional changes form a zig-zag pattern.

7. Exposure control apparatus according to claim 4 wherein said trip means is movable from an initial to a final position, further comprising means to adjustably position said inertia means along said locus of travel of said interval regulating means relative to the initial position thereof to vary the portion of said locus of travel through which said inertia means operates upon said regulating means for varying the magnitude of said inertial delay.

8. Exposure control apparatus for unblocking and blocking an exposure aperture to establish an exposure interval comprising:
  (a) an opening blade movable from an aperture blocking position to an aperture unblocking position to initiate said interval;
  (b) a closing blade movable from an aperture unblocking position to an aperture blocking position to terminate said interval;
  (c) manually engageable actuating means movable to operate said shutter blades;
  (d) cocking means responsive to movement of said actuating means for displacing said opening blade from its aperture unblocking position to its aperture blocking position and said closing blade from its aperture blocking position to its aperture unblocking position, said cocking means effecting release of said opening blade for return to its aperture unblocking position to initiate said interval;
  (e) latch means for positively latching said closing blade in its aperture unblocking position;
  (f) trip means movable through a locus of travel for disengaging said latch means from said closing blade at the termination of said travel to free said closing blade for movement to said aperture blocking position to terminate said interval, said trip means supporting elongated cam means characterized by a series of reverse inflections;
  (g) inertia means supporting a cam follower engageable with said elongated cam means for retarding movement of the trip means through said locus of travel to introduce delay between the release of said opening blade from said cocking means and the disengagement of said closing blade from said latch means;

(h) set means variably establishing predetermined relative positions of said trip means and said inertia means before exposure for variably controlling the magnitude of said delay; and (i) drive means responsive to said release of said opening blade for driving said trip means along said locus of travel from said predetermined position to said termination thereof, against the effect of said inertia means, to release said latch means, said interval between said release of said opening blade and said release of said latch means being dependent upon said magnitude of said delay.

9. Exposure control apparatus according to claim 8 further comprising:

(a) notch means on said cocking means;
(b) detent means on said opening blade engageable by said notch means during operation of cocking means to displace said opening blade, for preventing premature release of said opening blade prior to operation of said latch means, said notch means being disengageable from said detent means to effect release of said opening blade after operation of said latch means.

10. Exposure control apparatus for unblocking and blocking an exposure aperture to establish an exposure interval comprising:

(a) an opening blade movable from an aperture blocking position to an aperture unblocking position to initiate said interval;
(b) a closing blade movable from an aperture unblocking position to an aperture blocking position to terminate said interval;
(c) manually engageable actuating means movable to operate said shutter blades;
(d) cocking means responsive to movement of said actuating means for displacing said opening blade from its aperture unblocking position to its aperture blocking position and said closing blade from its aperture blocking position to its aperture unblocking position, said cocking means effecting release of said opening blade for return to its aperture unblocking position to initiate said interval;
(e) latch means for positively latching said closing blade in its aperture unblocking position;
(f) trip means movable through a locus of travel from an initial position to a final position for disengaging said latch means from said closing blade at the termination of said travel to free said closing blade for movement to said aperture blocking position to terminate said interval;
(g) inertia means operatively engageable with said trip means for retarding movement of the trip means through said locus of travel to introduce delay between the release of said opening blade from said cocking means and the disengagement of said closing blade from said latch means;
(h) set means variably establishing predetermined relative positions of said trip means and said inertia means before exposure for variably controlling the magnitude of said delay;
(i) drive means responsive to said release of said opening blade for driving said trip means along said locus of travel from said predetermined position to said termination thereof, against the effect of said inertia means, to release said latch means, said interval between said release of said opening blade and said release of said latch means being dependent upon said magnitude of said delay;

(j) resilient spring means on said opening blade for moving said trip means from said final position toward and to said initial position when said opening blade moves from aperture unblocking position to aperture blocking position; and (k) stop means for ending movement of said trip means at said initial position thereof, said resilient spring means permitting a small amount of overtravel of said opening blade after operation of said stop means to end said movement of said trip means.

11. Exposure control apparatus for unblocking and blocking an exposure aperture to establish an exposure interval comprising:

(a) an opening blade movable from an aperture blocking position to an aperture unblocking position to initiate said interval;
(b) a closing blade movable from an aperture unblocking position to an aperture blocking position to terminate said interval;
(c) manually engageable actuating means movable to operate said shutter blades;
(d) cocking means responsive to movement of said actuating means for displacing said opening blade from its aperture unblocking position to its aperture blocking position and said closing blade from its aperture blocking position to its aperture unblocking position, said cocking means effecting release of said opening blade for return to its aperture unblocking position to initiate said interval;
(e) latch means for positively latching said closing blade in its aperture unblocking position;
(f) trip means movable through a locus of travel from an initial position to a final position for disengaging said latch means from said closing blade to free said closing blade for movement to said aperture blocking position to terminate said interval;
(g) means on said trip means forming a pair of elongated oppositely facing cam surfaces characterized by a series of reverse inflections;
(h) inertia means mounted for selective relocation to various predetermined positions along said locus of travel of said trip means relative to said initial position;
(i) set means variably establishing a predetermined position of said inertia means;
(j) means on said inertia means defining a cam follower cooperating with said cam surfaces such that movement of said trip means causes said inertia means to oscillate back and forth, said oscillation of said inertia means being effective to retard movement of said trip means along said locus of travel to introduce delay between said release of said opening blade and said disengagement of said closing blade, the magnitude of said delay being controlled by said predetermined position of said inertia means; and
(k) drive means responsive to said release of said opening blade for driving said trip means along said locus of travel to said termination thereof, against the effect of said inertia means, to release said latch means.

12. Exposure control apparatus according to claim 11 wherein said opposed cam surfaces comprise a slot defining a zig-zag pattern.

13. Exposure control apparatus according to claim 11 further comprising:

(a) notch means on said cocking means; and
(b) detent means on said opening blade engageable by said notch means during operation of said cocking means to displace said opening blade, for preventing premature release of said opening blade prior to operation of said latch means, said notch means being disengageable from said detent means to effect release of said opening blade after operation of said latch means.

14. Exposure control apparatus according to claim 11 further comprising:
  (a) resilient spring means on said opening blade for moving said trip means from said final position toward and to said initial position when said opening blade moves from aperture unblocking position to aperture blocking position; and
  (b) stop means for ending movement of said trip means at said initial position thereof, said resilient spring means permitting a small amount of overtravel of said opening blade after operation of said stop means to end said movement of said trip means.

References Cited

UNITED STATES PATENTS 2,179,718  11/1939  Fedotoff _____ 95—60
2,731,895   1/1956  McKee _____ 95—60

JOHN M. HORAN, Primary Examiner

U.S. Cl. X.R.

95—60, 61, 63